(12) United States Patent
Subramanya et al.

(10) Patent No.: US 11,240,502 B2
(45) Date of Patent: *Feb. 1, 2022

(54) VIDEO ENCODING

(71) Applicant: TEXAS INSTRUMENTS INCORPORATED, Dallas, TX (US)

(72) Inventors: Prashanth N. Subramanya, Karnataka (IN); Ramakrishna Adireddy, Andhra Pradesh (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,813

(22) Filed: Sep. 29, 2020

(65) Prior Publication Data

US 2021/0014495 A1 Jan. 14, 2021

Related U.S. Application Data

(63) Continuation of application No. 16/290,256, filed on Mar. 1, 2019, now Pat. No. 10,834,401, which is a (Continued)

(51) Int. Cl.
*H04N 7/12* (2006.01)
*H04N 11/02* (2006.01)
(Continued)

(52) U.S. Cl.
CPC ......... *H04N 19/124* (2014.11); *H04N 19/103* (2014.11); *H04N 19/96* (2014.11)

(58) Field of Classification Search
None
See application file for complete search history.

(56) References Cited

U.S. PATENT DOCUMENTS 5,231,484 A * 7/1993 Gonzales ............... H04N 19/00
375/240.04
9,838,684 B2 * 12/2017 Coban .................. H04N 19/174
(Continued)

OTHER PUBLICATIONS

"Series H: Audiovisual and Multimedia Systems", Infrastructure of audiovisual services—Coding of moving video, Advanced Video Coding for Generic Audiovisual Services; ITU-T, H.264; Telecommunication Standardization Sector of ITU; Feb. 2014; pp. 1-790.

(Continued)

*Primary Examiner* — Chikaodili E Anyikire
(74) *Attorney, Agent, or Firm* — Charles F. Koch; Charles A. Brill; Frank D. Cimino

(57) ABSTRACT

A system can include a video processing engine to determine an estimated Quantization Parameter (QP) for a row of Coding Tree Units (CTUs) in a frame of a video. The processing engine can encode the row of CTUs in the frame of the video. A CTU in the row of CTUs can be encoded with a QP equal to the estimated QP. The system includes another video processing engine to determine an estimated QP for another row of CTUs of the frame of the video. The other processing engine can set a running QP to the estimated QP for the row of CTUs prior to the given video processor encoding a last CTU in the given row of CTUs. The other processing engine can further encode the other row of CTUs. CTUs encoded by the video processing engine and the other video processing engine can be stored in memory.

20 Claims, 4 Drawing Sheets

Related U.S. Application Data continuation of application No. 14/755,559, filed on Jun. 30, 2015, now Pat. No. 10,264,257.

(51) Int. Cl.
*H04N 11/04* (2006.01)
*H04N 19/124* (2014.01)
*H04N 19/96* (2014.01)
*H04N 19/103* (2014.01)

(56) References Cited

U.S. PATENT DOCUMENTS

| | | | | |
|---|---|---|---|---|
| 2012/0121011 A1* | 5/2012 | Coban | ............. | H04N 19/436 375/240.03 |
| 2012/0189052 A1 | 7/2012 | Karczewicz | | |
| 2013/0003823 A1* | 1/2013 | Misra | ............. | H04N 19/91 375/240.02 |
| 2013/0266233 A1* | 10/2013 | Kondo | ............. | G06T 9/008 382/233 |
| 2015/0003520 A1 | 1/2015 | Mody | | |
| 2015/0163498 A1 | 6/2015 | Shimada | | |
| 2015/0271531 A1 | 9/2015 | Wen | | |
| 2016/0014421 A1 | 1/2016 | Cote | | |

OTHER PUBLICATIONS

Series H: Audiovisual and Multimedia Systems, Infrastructure of audiovisual services—Coding of moving video. High efficiency video coding; ITU-T H.265; Apr. 2013; pp. 1-317.

Thomas Wiegand, et al., "Overview of the H.264/AVC Video Coding Standard", Publication, IEEE Transactions on Circuits and Systems for Video Technology, vol. 13. No. 7, Jul. 2003, pp. 560-576.

Pil-Kyu Park, et al., "Quantization Parameter Selection Method for H.264-Based Multi-View Video Coding", Publication, Department of Information and Communication Gwangju Institute of Science and Technology (GIST), Apr. 2008, pp. 466-471.

Pohsiang Hsu, et al., "A Predictive H.263 Bit-Rate Control Scheme Based on Scene Information", Publication, IEEE Aug. 2000, pp. 1735-1738.

* cited by examiner

VIDEO ENCODING

This application is a continuation of U.S. patent application Ser. No. 16/290,256, filed on Mar. 1, 2019, which is a continuation of prior application Ser. No. 14/755,559, filed on Jun. 30, 2015 (now U.S. Pat. No. 10,264,257), both of which are hereby incorporated by reference herein in their entirety.

TECHNICAL FIELD

This disclosure relates to systems and methods for implementing video encoding. More particularly, this disclosure relates to systems and methods for implementing video encoding on two or more video processing engines.

BACKGROUND

Video encoding is the process of compressing digital video files. Videos viewed on computers, tablets, mobile phones and set-top boxes go through an encoding process to convert the original "source" video to a compressed format which requires less space for storage and less bandwidth for transmission than the original source video. This process can also be referred to as "transcoding" or "video conversion".

A video encoding scheme can include a rate control algorithm that can dynamically adjust encoder parameters to achieve a target bitrate. The rate control algorithm can allocate a budget of bits to each group of pictures, individual picture and/or sub-picture in a video sequence.

SUMMARY

This disclosure relates to systems and methods for implementing video encoding. More particularly, this disclosure relates to systems and methods for concurrently encoding rows of Coding Tree Units (CTUs) of a frame of video on two or more video processing engines.

One example relates to a system that can include a given video processing engine to determine an estimated Quantization Parameter (QP) for a given row of Coding Tree Units (CTUs) in a frame of a video. The given processing engine can also encode the given row of CTUs in the frame of the video. A CTU in the given row of CTUs can be encoded with a QP equal to the estimated QP. The system can include another video processing engine to determine an estimated QP for another row of CTUs of the frame of the video. The other processing engine can also set a running QP to the estimated QP for the given row of CTUs prior to the given video processor encoding a last CTU in the given row of CTUs. The other processing engine can further encode the other row of CTUs. CTUs encoded by the given video processing engine and the other video processing engine can be stored in a non-transitory machine readable medium.

Another example relates to a non-transitory machine readable medium having instructions for implementing a method. The method can include encoding, at the given video processing engine, a QP equal to an estimated QP for a given row of CTUs of a video frame into a CTU of the given row of CTUs. The method can also include estimating, at another video processing engine, a QP for another row of CTUs of the video frame. The method can further include setting, at the other video processing engine, a running QP for the other row of CTUs to the estimated QP for the given row of CTUs. The method can yet further include encoding, at the other video processing engine, the other row of CTUs. The encoding of the other row of CTUs can be initiated prior to completion of the encoding of the given row of CTUs. CTUs encoded by the given video processing engine and the other video processing engine can be stored in a non-transitory memory.

Yet another example relates to a method that can include setting a running QP for a given row of CTUs of a video frame, to an estimated QP for another row of CTUs of the video frame. The method can also include encoding the given and the other rows of CTUs concurrently. A QP equal to the estimated QP for the other row of CTUs can be encoded into a CTU of the other row of CTUs. The method can further include storing the encoded CTUs into a non-transitory machine readable medium.

DETAILED DESCRIPTION

Systems and methods are described for encoding video data with a multi-core and/or a multiprocessor video encoding processor. The system can include a given video processing engine (e.g., a processor core) and another video processing engine (e.g., another processor core). The first video processor can determine an estimated Quantization Parameter (QP) for a given row of Coding Tree Units (CTUs) in a frame of video and encode the given row of CTUs in a frame of video, and a CTU in the given row of CTUs is encoded with a QP equal to the estimated QP. The other video processor can estimate a QP for another row of CTUs and encode the other row of CTUs. The QP encoded into the last CTU of given row of CTUs can be employed to facilitate encoding of the other row of CTUs. In some situations, such as situations where all the CTUs in the given row of CTUs are skipped, the given processor can be forced to encode the QP in a last CTU of the given row, such that this encoded QP can still be employed by the other processor to facilitate encoding the other row of CTUs.

In this manner, the given and the other video processing engines can operate in parallel. By implementing the system in the manner described herein, the rows of CTUs of the video can be efficiently encoded in parallel (e.g., concurrently and out of raster-order) while maintaining compliance with predefined format standards such as the High Efficiency Video Coding (HEVC) format.

Figure 1:
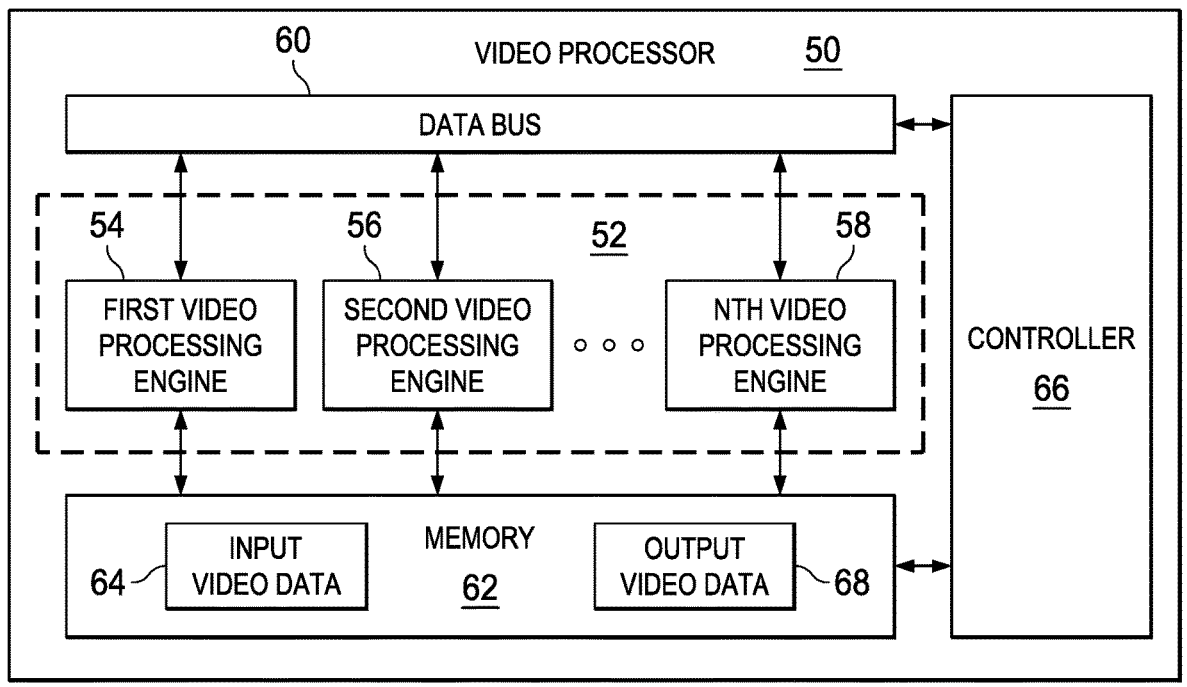
FIG. 1 illustrates an example of a video processor for encoding video data.

FIG. 1 illustrates a block diagram of a video processor 50 for encoding video data (e.g., a video stream or a video file). The video processor 50 can be implemented as a video encoder. The video processor 50 could be a general purpose computing processor or Application Specific Integrated Circuit (ASIC) chip. In some examples, the video processor 50 could be implemented as programmable circuitry that can be configured to perform multiple functions. In other examples, the video processor 50 can be implemented as machine readable instructions (e.g., software) executed by a processing device. In yet another example, the video processor 50 is a combination of a hard wired processor and machine readable instructions implemented on a processing device. The video processor 50 could be implemented as a HEVC encoder, such as according to the ITU-T H.265 standard or the Moving Pictures Experts Group 4 (MPEG-4) Advanced Video Coding (AVC) format according to the ITU-T H.264 standard, which are incorporated herein by reference.

The video processor 50 can include N number of video processing engines 52, where N is an integer greater than or equal to two (2). The video processing engines 52 can include a first video processing engine 54, a second video processing engine 56 and an Nth video processing engine 58. Each video processing engine 52 can be implemented as a processor core of a common integrated circuit (IC) chip. It is noted that in some examples, the video processor 50 can be representative of multiple IC chips. In such a situation, each of the video processing engines 52 (or some subset thereof) can be implemented on discrete IC chips.

Each of the video processing engines 52 can communicate with each other via a data bus 60. Additionally, each of the video processing engines 52 can access a memory 62. The memory 62 can be a non-transitory machine readable medium, such as volatile or nonvolatile random access memory (RAM). The memory 62 could be representative, for example of a data cache. Each of the video processing engines 52 can read and write data to the memory 62. The memory 62 can include input video data 64 that can be provided from another source (e.g., a video source). The video source could be an external system, such as a computing device, a digital camera or nearly any other system capable of providing digitized video data to the video processor 50. The input video data 64 can characterize a digital representation of a plurality of consecutive video frames that collectively form a video stream or a video file.

The video processor 50 can include a controller 66 that can control the operations of the video processing engines 52. In some examples, the operations of the controller 66 can be implemented on one or more of the N video processing engines 252 (e.g., the first video processing engine 54). In other examples, the controller 66 can be implemented on a separate processor core and/or as logic circuitry of the video processor 50. The controller 66 can include logic for interfacing the video processor 50 with external systems. In some examples, the controller 66 can control a data flow between the memory 62 and the external systems.

The input video data 64 can be formatted in a specific format, such as the Movie Pictures Experts Group 2 (MPEG-2) format, a lossless coding format such as the MPEG-4 Scalable Lossless Coding format, etc. In other examples, the input video data 64 can represent raw, uncompressed video data. The video processor 50 can encode (e.g., transcode and/or compress) the input video data 64 into a specific format, such as the HEVC format defined by the H.265 standard or the MPEG-4 AVC format defined by the H.264 standard. The encoding can be performed in a frame-by-frame operation. More particularly, the video processing engines 52 of the video processor 50 can implement parallel row-level (or group row-level) video encoding. That is, each of the video processing engines 52 can encode a row (or group of rows) of a video frame concurrently. The encoding can be implemented, for example, with a rate control algorithm implemented by the video processor 50. The rate control algorithm can dynamically adjust parameters of the encoding process to achieve a target bitrate, while ensuring the encoded data complies with the HEVC format.

In an extended given example, (hereinafter, "the given example") it is presumed that there are three (3) video processing engines 52, such that N is equal to three (3). However, in other examples, more or less video processing engines 52 can be implemented.

Figure 2:
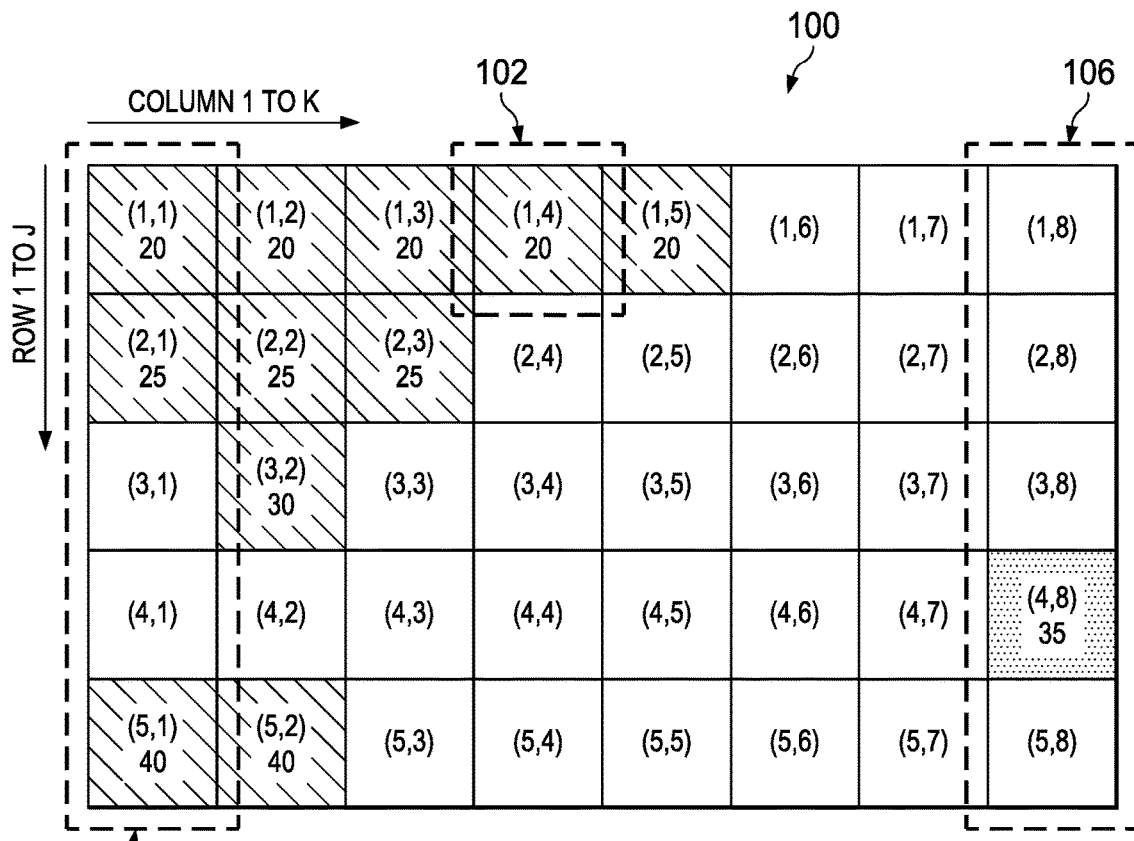
FIG. 2 illustrates an example of a frame of a video being encoded.

FIG. 2 illustrates a video frame 100 that is being encoded by the video processor 50 of FIG. 1 in the given example. The frame 100 can be segmented (e.g., by the controller 66) into Coding Tree Units (CTUs) 102. The encoding by the video processor 50 can also be implemented with a mode decision algorithm (module). The mode decision algorithm can determine how and if each CTU 102 (or some subset thereof) is further divided into coding units. Additionally, the mode decision algorithm can select parameters for each of the coding units. For purposes of simplification of explanation, in FIG. 2, only one (1) of the CTUs 102 is labeled with a reference number, but each of the CTUs 102 can be implemented in a similar manner. Each CTU 102 can be implemented as a block of pixels (e.g., 64×64, 32×32 or 16×16 pixels per CTU). It is noted that in situations where the frame 100 is encoded (e.g., compressed) into the MPEG-4 AVC format, each CTU 102 can be processed as a macroblock with 16×16 pixels. The frame 100 can have J number of rows and K number of columns of CTUs 102, wherein J and K are integers greater than or equal to two (2). Thus, each CTU 102 can be referenced by a two-dimensional number (x,y) where 'x' denotes a row number and 'y' denotes a column number, which is included in each CTU 102. For example, the CTU illustrated with the reference number 102 can be CTU (1,4).

Each CTU 102 can have a predetermined size that can vary based on the encoder configuration. The size of each CTU 102 is constant for a frame 100. In some examples, each CTU 102 can have a size between 16×16 pixels and 64×64 pixels but the size of a CTU 102 is constant for a given frame 100. Some of the CTUs 102 are further divided into CUs (Coding Units) of smaller sizes.

The controller 66 can assign each of the video processing engines 52 a set of rows of CTUs 102 to encode. The assignment of the set of rows can be performed sequentially or semi-sequentially. In the given example, the first video processing engine 54 can be assigned to encode rows 1, 4, 7, 10 . . . of the frame 100. Additionally, in the given example, the second video processing engine 56 can be assigned to encode rows 2, 5, 8, 11 . . . of the frame 100. Similarly, in the given example, the Nth video processing engine 58 (the third video processing engine) can be assigned to encode rows 3, 6, 9, 12 . . . of the frame 100. In other examples, different sets of rows can be assigned. For instance, in some situations, consecutive rows can be assigned to the same video processor 52. Moreover, in some situations, a given video processing engine 52 may be assigned more rows for encoding than another video processing engine 52 (e.g., unequal distribution of resources).

Each CTU 102 can be assigned a Quantization Parameter (QP) that can be selected by the rate control algorithm of the video processor 50 (e.g., a video encoder). The QP regulates how much spatial detail is saved within a particular CTU 102. In some examples, the QP can be an integer between '0' and '51'. When the QP is small (e.g., from '0' to about '10'), almost all detail of a CTU 102 is retained. As the QP is increased, some of that detail is aggregated so that the bit rate drops at a cost of some increase in distortion and some loss of quality.

Continuing with the given example, the frame 100 is illustrated as having five (5) rows and eight (8) columns. In the given example, each CTU 102 is either shaded or unshaded. The unshaded CTUs 102 represent skip-blocks. For instance, in the first row (row '1') of the frame 100, CTUs (1,6) to (1,8) are each skip blocks. It is noted that although CUs can be skip or non-skip rather than CTUs, for the simplicity of explanation it is presumed that CTUs are implemented as skip blocks or non-skip blocks throughout this disclosure.

A skip block is a CTU 102 where the content of the CTU 102 is static relative to a previous frame in a video stream or a video file. In a typical video stream or video file, each of the successive frames will include material that does not change from one frame to the next. For instance, in animated content (e.g., cartoons) where backgrounds are partially (or completely) static, only certain portions of a video stream change from one frame to the next. It is noted that each skip block has an associated QP. However, as described herein, the QP of each skip block is inherited from a previously encoded QP (e.g., a running QP), and the QP associated with the skip block is not encoded into the skip block.

Each shaded CTU 102 illustrated in the frame 100 can represent a non-skip block of video data (e.g., dynamic from one frame to the next). A non-skip block of video data is a block of pixels in the frame 100 where the content of the CTU 102 is dynamic (e.g., changes) from one frame to the next in a video stream or video file. The shaded CTUs 102 each include an integer denoting a QP encoded for the associated CTU 102. It is noted that the values encoded into the non-skip block CTUs 102 can be a differential QP, which corresponds to a difference between an absolute value for a QP and a current running QP. However, for purposes of simplification of explanation, throughout this disclosure, in the examples described, it is presumed that the value encoded into a CTU 102 is an absolute value QP, which (as explained herein) may be equal to an estimated QP. For instance, the CTU (1,1) includes the integer '20', which denotes an encoded QP for the CTU (1,1). The QP for the first CTU 102 (CTU (1,1) can be set to a default value ('20' in the given example). Subsequent QPs can be calculated using techniques such as the Test Model Near Term Version 5 (TMN5) rate control algorithm. For instance, in a simplified example, the QP of a CTU can be calculated using [0030].

$$QP = QP_{prev}(1 + G_{adj} + L_{adj})$$

Where in:

QP is the Quantization Parameter calculated for a given CTU 102;

$QP_{prev}$ is the Quantization Parameter calculated for a previous CTU 102 relative to the given CTU 102, which is also referred herein to as a "running QP";

$G_{adj}$ is the global adjustment factor for a frame (e.g., the frame 100) and is defined by [0031]; and $L_{adj}$ is the local adjustment factor for the CTU 102 and is defined by [0032].

$$G_{adj} = \frac{B_{n-f_{skip}-1} - b_{target}}{2 * B_{target}};$$

$$L_{adj} = \frac{12 * \left(B_{n,k} - \frac{k}{CTU} Btarget\right)}{R};$$

Where in:

$B_n$ is the total number of bits needed to encode frame number 'n' (e.g., the frame 100);

$B_{target}$ is a selected target number of bits per encoded frame (e.g., the frame 100);

$f_{skip}$ is the number of frames of a video feed to be skipped;

R is selected bit rate for an output channel;

k is the number of the CTU 102 being encoded;

CTU is the total number of CTUs 102 in the frame (e.g., the frame 100); and $b_{target}$ is the target bitrate of an output buffer.

Thus, in some examples, such as the examples described in Equation 1, the QP of a previous CTU 102 influences the selection of the QP for a current CTU 102. For instance, in some examples, the QP of CTU (1,2) is (by employing Equation 1) may be influenced by the QP of CTU (1,1). Additionally, estimation of the QP for a first CTU 102 of a row (other than the first CTU 102 of the first row) may be influenced by the last QP calculated for a CTU 102 of the previous row. It is noted, in the situation illustrated by the Frame 100, the QP is not encoded for CTUs (1,6)-(1,8), which correspond to skip blocks. Each of the of the CTUs (1,6) to (1,8) can inherit the running QP of '20' (by virtue of the encoding of the estimated QP into CTU (1,5)). Additionally, it is noted that in other examples, alternate equations could be employed for selecting a QP for a CTU 102. For instance, in some examples, an alternate equation for implementing row level QP modulation could be employed.

The encoding algorithm implemented by the video processor 50 can dictate that the controller 66 (or other component) maintains a "running QP" for each row of CTUs 102. The running QP represents the last encoded QP in raster scan order. The running QP can be modified each time a new QP is estimated and encoded for a non-skip block. Each of the skip-blocks in a raster-scan order can inherit the running QP for encoding purposes until another QP is estimated and encoded for another non-skip block.

In the present encoding algorithm implemented by the video processor 50 (e.g., a video encoder), a QP that is estimated (e.g., predicted) for a previous row of CTUs 102 is set to the actual running QP for the first CTU 102 of a current row. To accomplish this, the associated video processing engine 52 can cause/force encoding of the estimated QP for the previous row of CTUs 102 in the frame 100 by designating the first or last CTU 102 (a CU inside the CTU 102 is coded) of a row as a non-skip block. That is, the associated video processing engine 52 can designate either the first column 104 or the last column 106 in each row of CTUs 102 of the frame 100 as a non-skip block.

Designating the last column 106 (last CU of the last CTU 102) of the given row as the non-skip block includes advantages over designating the first column 104 of the given row as the non-skip block. In particular, to avoid unnecessary calculations and encodings by the associated video processing engine 52 (e.g., a video encoder), the last CTU 102 in a row of the frame 100 is designated as a non-skip block in situations where the running QP is different from the estimated QP. In some examples, to further avoid unnecessary calculation and encodings by the associate video processing engine 52, the last CTU 102 in a row of the frame 100 is designated as a non-skip block only in situations where the running QP is different from the estimated QP. Additionally, issues related to spatial error propagation (e.g., visual artifacts) can be reduced or eliminated by designating the last CTU 102 in a row of CTUs 102 as the non-skip block. Thus, for purposes of simplification of explanation, unless otherwise noted, it is presumed that the last column 106 is designated as the non-skip block when appropriate.

In the given example, it is presumed that the video processors 52 (video encoders) implements row level QP modulation, such that each CTU 102 in a row of CTUs 102 have the same QP. However, in other examples, CTU level QP modulation could be employed, wherein each CTU 102 in a row of CTUs 102 can employ a different QP. In the given example, the mode decision algorithm of the video processor 50 (e.g., an encoder) can set a running QP that can be an estimated QP for the first row, and can be employed as the QP for the first row of CTUs 102, namely CTUs (1,1)-(1,8). In some examples, the estimated QP can be a default QP. The default QP could be, for example, a predetermined QP that can be based on factors such as an expected average detail in the frame 100, an available bandwidth, etc. In other examples, techniques/equations can be employed to generate the estimated QP for the first row. The QP is estimated for the first row (or any other row) of CTUs 102 prior to encoding the CTUs 102 of a row. In this manner, the estimated QP can be provided to other video processors 52, as explained herein. It is presumed that the estimated QP for the first row of CTUs 102 is to '20'. The first video processing engine 54 can encode the first row of CTUs 102, namely CTUs (1,1) to (1,8). Additionally, the first video processing engine 54 can encode a the estimated QP for the first row ('20') into each of the CTUs (1,1) to (1,5). Further, the first video processing engine 54 does not need to designate the last CTU 102 of row one (1), namely CTU (1,8) as a non-skip block since the running QP is the same as the estimated QP at the time of encoding the CTU (1,8).

In the given example, concurrently with the encoding of the first row of CTUs 102 in the frame 100, the second video processing engine 56 can determine an estimated QP for the second row CTUs 102. In the given example, it is presumed that the estimated QP for the second row of CTUs 102 is set to '25'. Moreover, the second video processing engine 56 can encode the second row of CTUs 102, namely CTUs (2,1) to (2,8) and the estimated QP for the second row ('25') can be encoded for CTUs (2,1) to (2,3). In some examples, as noted, the estimated QP for the first row of the frame 100 (which is encoded into the CTU (1,5)) can employed to estimate the QP for the second row of CTUs 102. In this manner, the second video processing engine 56 does not need to wait (e.g., delay) for encoding of the CTU (1,8) prior to initiation of encoding the second row of the CTUs 102 of the frame 100. Rather, the second video processing engine 56 would need merely to delay encoding of the CTUs (2,1)-(2,8) until the estimated QP for the first row of CTUs 102 is received/retrieved by the second video processing engine 56. Additionally, the estimated QP for the second row of CTUs 102 ('25') for the frame 100 does not need to be encoded as the running QP for CTU (2,8), since the running QP for the second row is the same as the estimated QP due to the encoding of CTU (2,3). Consequently, the last CTU 102 of the second row, namely CTU (2,8) does not need to be designated as a non-skip block.

Further, concurrently with the encoding of the first and second rows of the CTUs 102, in the given example, the Nth (the third) video processing engine 58 can encode the third row of CTUs 102, namely CTUs (3,1) to (3,8). As illustrated, the CTU (3,1) is a skip block. In this situation, the running QP is not changed when CTU (3,1) is encoded. Thus, the running QP is inherited from the previously encoded QP, which in the present example is '25' (from the second row of CTUs 102). Moreover, in this, the third video processing engine 58 can estimate a QP for the third row of CTUs 102, which can be set to '30'. In some examples, the QP estimated for the third row of CTUs 102 can based on the estimated QP for the second row ('25') of the CTUs 102, which is encoded into CTU (2,3). Moreover, since the running QP for the third row is the same as the estimated QP at the time of encoding (in raster-scan order) of the last CTU (3,8) in the third row, and the estimated QP for the third row is encoded into CTU (3,2), the CTU (3,8) is not designated as a non-skip block.

Encoding of the fourth row of the CTUs 102 of the frame 100 can be assigned to the first video processing engine 54. As is illustrated, the fourth row of the frame 100 includes only skip blocks. The first video processing engine 54 can employ the estimated QP for the third row of CTUs 102, ('30') to estimate the QP for the fourth row of CTUs 102, which can be set to 35 by the rate control algorithm. In the given example, it is presumed that the estimated QP for the fourth row is '35'. The first video processing engine 54 can set the running QP for the fourth row equal to the estimate QP for the third row. The first video processing engine 54 can designate the CTU (4,8) (last CU inside the CTU) as a non-skip block thereby dictating that the first video processing engine 54 encode a QP for CTU (4,8) based on the estimated QP for the fourth row, and encodes the estimated QP for the fourth row ('35') into the CTU (4,8). In FIG. 2, a light shading pattern is employed to denote that the CTU (4,8) has been designated (e.g., set or forced) as a non-skip block. Additionally, the running QP for the fourth row of CTUs 102 can be set to the estimated QP for the fourth row.

Concurrently with the encoding of the fourth row of CTUs 102, the second video processing engine 56 can determine an estimated QP for the fifth row of CTUs 102 in the frame 100. In the given example, it is presumed that the estimated QP for the fifth row of CTUs 102 is '40'. Additionally, the second video processing engine 56 can set a running QP for the fifth row to the estimated QP for the fourth row of CTUs 102 ('35'). The second video processing engine 56 can encode the fifth row of CTUs 102 of the frame 100. In this situation, the first video processing engine 54 and second video processing engine 56 can encode fourth and fifth row of CTUs 102 in parallel since, at the end of the fourth row of CTUs 102 running QP will be set (e.g., forced) to the estimated QP of fourth row of CTUs 102. The second video processing engine 56 can employ the QP estimated for the fifth row as the running QP after encoding of CTUs (5,1) and (5,2). Moreover, the CTU (5,8) is not designated as a non-skip block since the running QP for the fifth row of the CTUs 102 would be the same as the estimated QP for the fifth row of CTUs 102 in the frame 100 when the last CTU (5,8) in the fifth row is encoded.

In general, the video processor 50 (e.g., a video encoder) can cause/force a video processing engine 52 to encode a QP for at least one CTU 102 in each row of CTUs 102, even if each of the CTUs 102 in a particular row would conventionally be designated as skip-blocks. In the examples described herein, the video processing engines 52 can be caused/forced to encode a QP for the CTUs 102 in the last column 106 of the frame 100 in situations where a running QP is different from an estimated QP of a respective row at a time of encoding the CTUs 102 of the last column 106 of the respective row.

In some examples, the video processor 50 can implement group CTU row level QP modulation (e.g., groups of rows that have the same QP). In some cases of group CTU row level QP modulation, only the last CTU of a first or a last row in the group of rows would need to be designated as the non-skip block if the running QP is different from the estimated QP at the time of encoding the last column in the group of CTUs. It is noted that in situations where the same video processing engine 52 is assigned to encode an entire group of rows in raster scan order, it may be preferable to designate the last (or first) CTU of last row of CTUs in the group of rows as the non-skip block. However, it is noted that in some other cases of group CTU row level QP modulation, such as situations where different rows of the group of rows are encoded by different video processing engines 52 the last (or first) CTU of first row of CTUs may be designated as the non-skip block.

Additionally, as noted, in some examples, the video processor 50 (e.g., a video encoder) can be implemented with CTU level QP modulation. In such a situation, consecutive CTUs 102 on the same row can be have differing QPs. In this situation, a video processing engine 52 can designate a last (or first) CTU 102 of a given row of CTUs as a non-skip CTU 102 and encode a QP estimated for the given row of QPs into the last QP of the given row if the running QP is different from the estimated QP for the given row at a time of encoding the last CTU in the given row. For example, if a previous non-skip CTU 102 of the given row has a QP different than the estimated QP for the given row, the running QP for the given row can change. Thus, to alleviate this problem in this situation, the video processing engine 52 (assigned to encode the given row of CTUs 102) can designate the last CTU 102 in the given row as a non-skip block, and the estimated QP for the given row is encoded into the last CTU in the given row. Accordingly, in CTU level QP modulation, there are situations where the last CTU 102 in a row is designated as a non-skip block even when other blocks in the row are also non-skip blocks.

The data encoded by each of the video processing engines 52 can be output as output video data 68 that can be stored in the memory 62. In some examples, the output video data 68 can be provided to an external system, including but not limited to a set-top box, a video screen with a built in decoder, a desktop computer, a tablet computer, a smartphone, etc. By implementing the video processor 50 (e.g., a video encoder) in this manner, the video processor 50 can implement a multi-core encoding scheme (e.g., the video processing engines 52) that can generate the output video data 68 that complies with the HEVC format standard set forth in H.265 or the MPEG-4 AVC format set forth in H.264. Moreover, the video processor 50 can alleviate the dependence of encoding CTUs in raster-scan order, thereby allowing parallel processing of multiple rows of CTUs 102. In particular, through parallel processing in the manner described, the multi-core encoding scheme implemented by the video processor 50 can achieve core utilization of up to about 85%.

Figure 3:
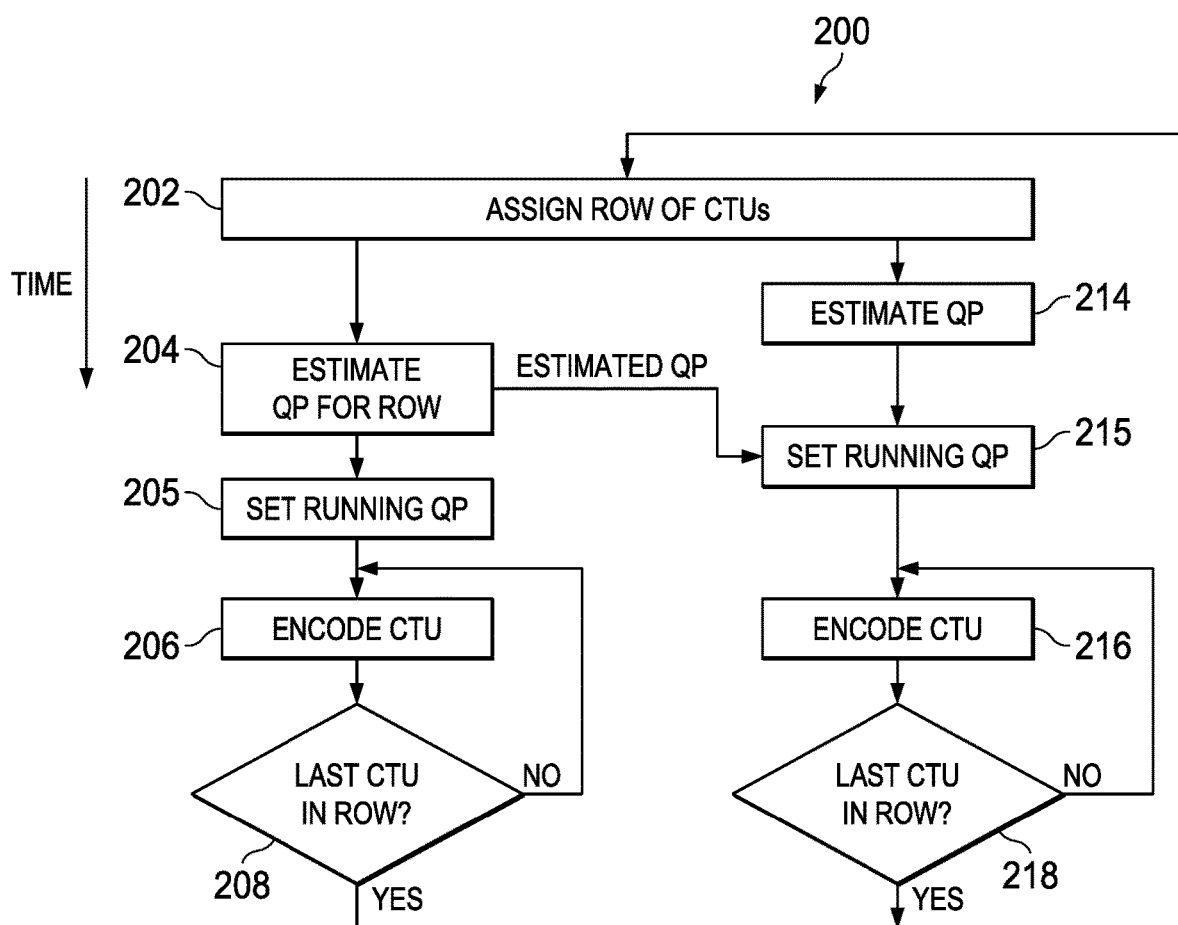
FIG. 3 illustrates a flowchart of an example of algorithm for an encoder to encode video data.

FIG. 3 illustrates a flow chart of an example of an algorithm for an encoder 200 that could be implemented, for example, by a multiprocessor or multicore processing system, such as the video processor 50 (e.g., an encoder) illustrated in FIG. 1. The algorithm for the encoder 200 can be employed, for example, to encode (e.g., compress and/or transcode) video data that is received from an external source into a specific format. Moreover, as described herein, the algorithm for the encoder 200 can efficiently implement parallel processing without undue delay caused by conventional raster-order encoding, while maintaining compliance with the standards of the specific format such as the HEVC format. As is illustrated in FIG. 3, a time line indicates an order of operations.

At 202, rows (or groups of rows) of CTUs of a frame of video can be assigned (e.g., by the controller 66 of FIG. 1) to different video processing engines (e.g., the video processing engines 52 of FIG. 1) for encoding. In the example described with respect to FIG. 3, it is presumed that the video processor includes two video processing engines, namely a first and second video processing engine, such as the first video processing engine 54 and the second video processing engine 56 illustrated in FIG. 1. However, in other examples, more video processing engines could be implemented. Each video processing engine 52 can execute a thread that can be executed concurrently with another video processing engine executing another thread to implement the overall algorithm for the encoder 200. That is, the first video processing engine 54 can execute a first thread of the encoder and the second video processing engine 56 can concurrently execute a second thread of the encoder. It is noted that in the example illustrated in FIG. 3, row level QP modulation is described and illustrated. However, in other examples, CTU level QP modulation could be implemented. Additionally, for purposes of simplification of explanation in FIG. 3 is illustrated and described with the presumption that entire CTUs are either skip blocks or non-skip blocks. However, in some examples, CUs (subsets of CTUs) can be skip or non-skip.

At 204, the first video processing engine (e.g., via a rate control algorithm) can estimate a QP for the assigned row of CTUs of the frame. Additionally, at 205, the running QP for the first row of CTUs can be set to the estimated QP for the first row of CTUs. At 206, the first video processor can encode a CTU of the assigned row of CTUs. Details of the encoding 206 are described with respect to FIG. 4, which illustrates an expanded view of the operations.

Figure 4:
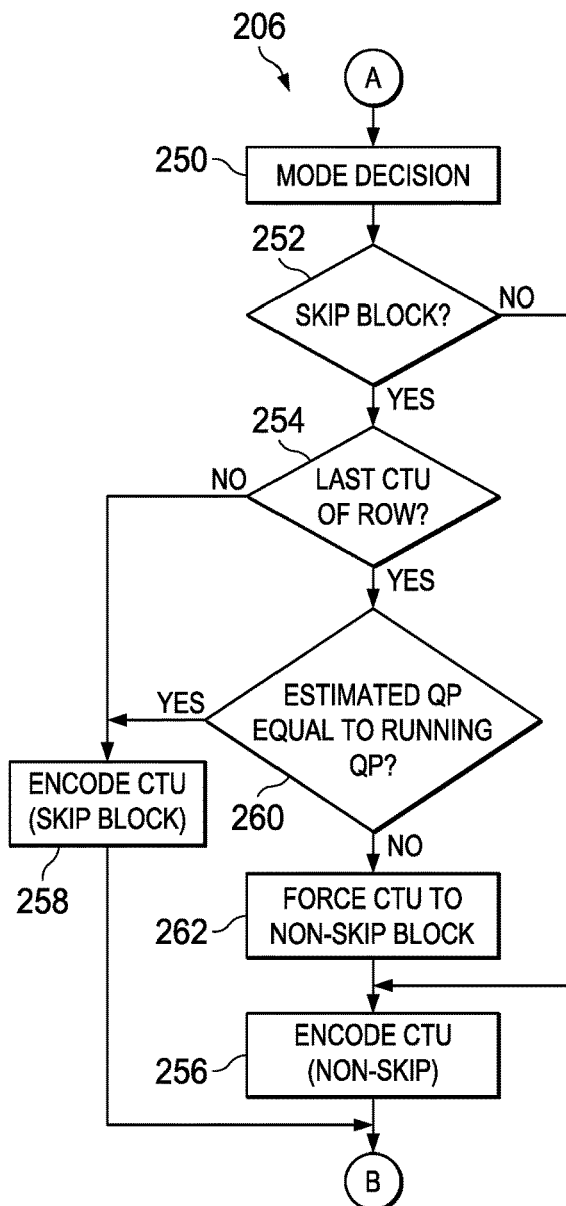
FIG. 4 illustrates a flowchart of an example of a portion of the algorithm for the encoder illustrated in FIG. 3 for encoding a Coding Tree Unit (CTU).

As is illustrated in FIG. 4, point 'A' leads to a mode decision 250 by the first video processing engine as to if and how a CTU is to be divided into multiple coding units. At 252, the mode decision can determine whether a current CTU is a skip block. If the determination at 252 is positive (e.g., "YES"), the encoding 206 can proceed to 254. If the determination at 250 is negative (e.g., "NO"), the encoding 206 can proceed to 256.

At 254, the first video processing engine can determine whether the CTU is the last CTU of the row. If the determination at 254 is negative (e.g., NO), the encoding 206 can proceed to 258. If the determination at 254 is positive (e.g., YES), the encoding 206 can proceed to 260.

At 256, the CTU can be encoded (e.g., compressed) by the first video processing engine and the running QP for the first row of CTUs can be set to the estimated QP for the first row of CTUs. The encoding of the CTU can include encoding the running QP into the CTU. The encoded (e.g., compressed) data can be stored in the video data. The encoding 206 can proceed to point 'B', such that the algorithm of the encoder 200 illustrated in FIG. 3 can be continued.

At 258, the first video processing engine can encode the CTU using skip block encoding techniques. The encoding can be stored in video output data (e.g., the video output data 68 illustrated in FIG. 1). Moreover, the encoding 206 can proceed to point 'B', such that the encoder 200 illustrated in FIG. 3 can be continued.

At 260, the first video processor can determine whether the estimated QP is equal to the running QP. If the determination at 260 is positive (e.g., YES), the encoding 250 can proceed to 258. If the determination at 260 is negative (e.g., NO), the encoding 250 can proceed to 262. At 262, the first video processing engine can force (e.g., designate) the CTU as a non-skip block, and the encoding 206 can proceed to 256. Thus, it is noted, that at 262 and 256, the estimated QP for the last CTU in a row is encoded into the last CTU by setting (e.g., forcing) the last CTU to be a non-skip block even if the last CTU would conventionally be a skip-block, providing that the estimated QP is different from the running QP.

Returning to FIG. 3, at 208, the first video processing engine can make a determination as to whether the encoded CTU is the last CTU in the assigned row of CTUs. If the determination at 208 is positive (e.g., YES), the algorithm for the encoder 200 can return to 202. If the determination at 208 is negative (e.g., NO), the algorithm for the encoder 200 can return to 206.

At 214, the second video processing engine can estimate a QP for the second row of CTUs (e.g., via the rate control algorithm). At 215, the second video processing engine can set a running QP to the estimated QP for the first row of CTUs (e.g., more generally, the estimated QP for the previous row of CTUs of the frame). At 216, the second video processing engine can encode a CTU of the second row of CTUs of the frame. Details of the encoding 216 are described with respect to FIG. 5, which illustrates an expanded view of the operations.

Figure 5:
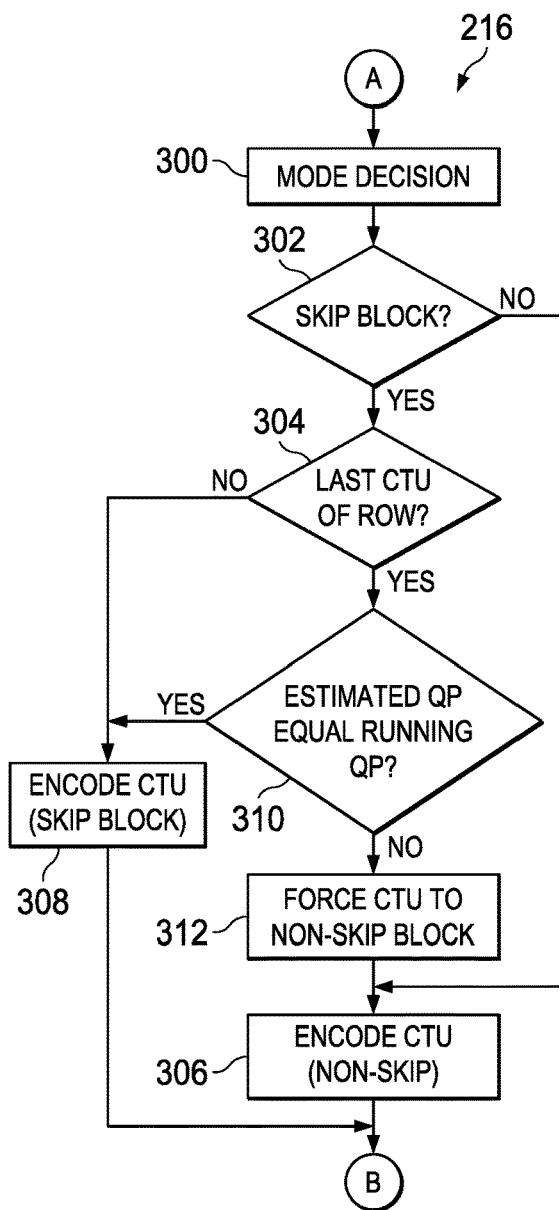
FIG. 5 illustrates another flowchart of an example of a portion of the rate algorithm for the encoder illustrated in FIG. 3 for a CTU.

As is illustrated in FIG. 5, point 'A' leads to a mode decision 300 by the second video processing engine as to if and how a CTU is to be divided into multiple coding units. At 302, the mode decision can determine whether a current CTU is a skip block. If the determination at 302 is positive (e.g., "YES"), the encoding 216 can proceed to 304. If the determination at 302 is negative (e.g., "NO"), the encoding 216 can proceed to 306.

At 304, the first video processing engine can determine whether the CTU is the last CTU of the row. If the determination at 304 is negative (e.g., NO), the encoding 216 can proceed to 308. If the determination at 304 is positive (e.g., YES), the encoding 216 can proceed to 310.

At 306, the CTU can be encoded (e.g., compressed) by the second video processing engine and the running QP for the second row of CTUs can be set to the estimated QP for the second row of CTUs. The encoding of the CTU can include encoding the running QP into the CTU. The encoded (e.g., compressed) data can be stored in the video data. The encoding 216 can proceed to point 'B', such that the algorithm of the encoder 200 illustrated in FIG. 3 can be continued.

At 308, the second video processing engine can encode the CTU using skip block encoding techniques. The encoding can be stored in video output data (e.g., the video output data 68 illustrated in FIG. 1). Moreover, the encoding 216 can proceed to point 'B', such that the algorithm of the encoder 200 illustrated in FIG. 3 can be continued.

At 310, the second video processing engine can determine whether the estimated QP is equal to the running QP. If the determination at 310 is negative (e.g., NO), the encoding 216 can proceed to 312. If the determination at 310 is positive (e.g., YES), the encoding 216 can proceed to 308. At 312, the second video processing engine can force (e.g., designate) the CTU as a non-skip block (last CU of the CTU), and the encoding 216 can proceed to 306. Thus, it is noted that at 312 and 306, the estimated QP for the last CTU in a row is encoded into the last CTU by setting (e.g., forcing) the last CTU to be a non-skip even if the last CTU would conventionally be a skip-block, providing that the estimated QP is different from the running QP.

Returning to FIG. 3, at 218, the second video processing engine can make a determination as to whether the encoded CTU is the last CTU in the assigned row of CTUs. If the determination at 218 is positive (e.g., YES), the encoder algorithm 200 can return to 202. If the determination at 218 is negative (e.g., NO), the encoder algorithm 200 can return to 216.

As is illustrated and described with respect to FIG. 3, the second video processing engine does not need to wait idly for the first video processing engine to complete encoding of the entire first row of CTUs prior to initiating encoding of the second row of CTUs. Rather, the second video processing engine receives the estimated QP for the previous row and employs that estimated QP to set a running QP for the second row of CTUs. Moreover, as demonstrated, the algorithm for the encoder 200 ensures that the estimated QP for a row is encoded into a CTU of the row. In this manner, efficient parallel processing can be achieved, while maintaining compliance with standards set forth in H.265 for the HEVC format or the standards set forth in H.264 for the MPEG-4 AVC format.

Figure 6:
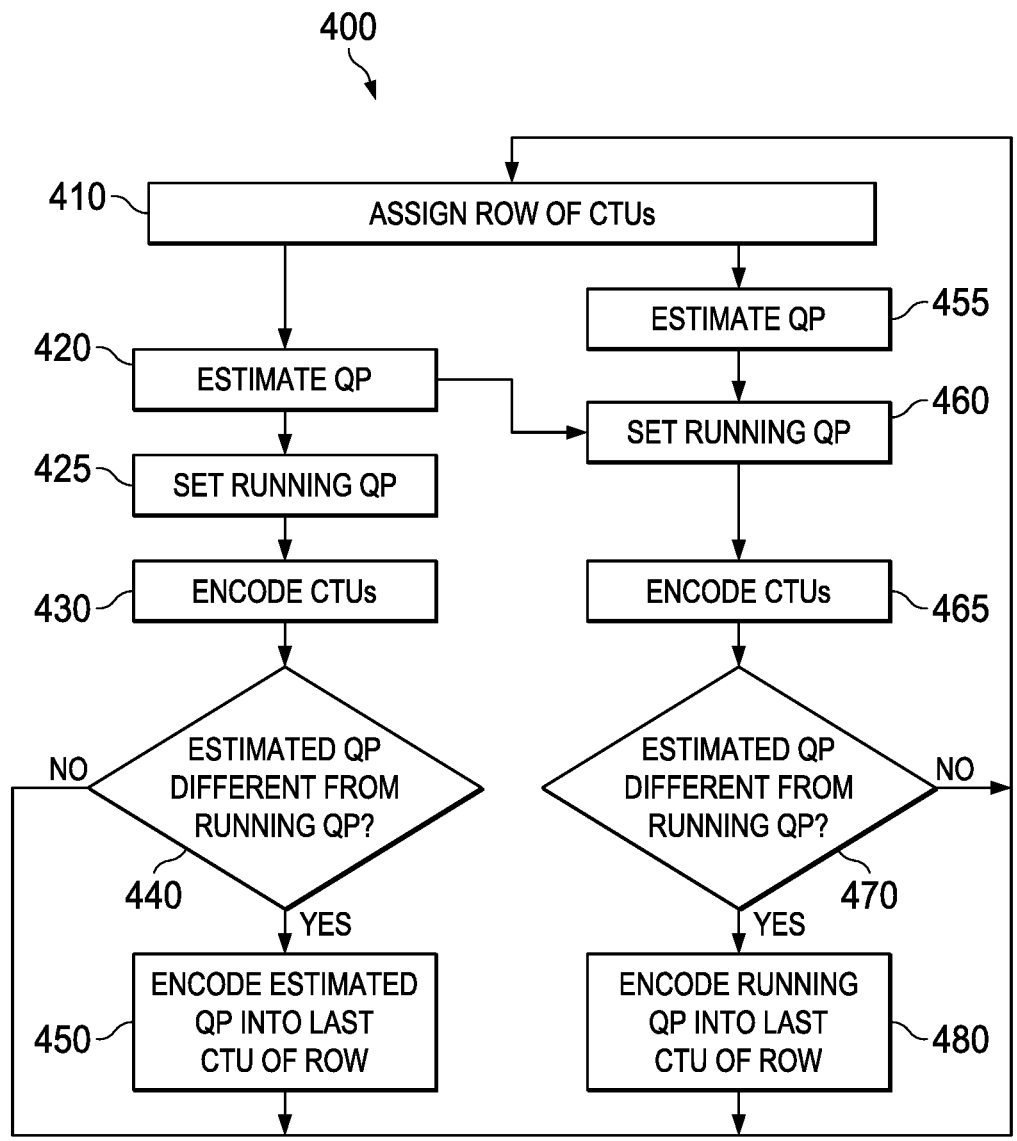
FIG. 6 illustrates a flowchart of an example of a method for encoding video data.

In view of the foregoing structural and functional features described above, an example method will be better appreciated with reference to FIG. 6. While, for purposes of simplicity of explanation, the example method of FIG. 6 is shown and described as executing both serially and in parallel, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 6 can be implemented as instructions stored in an IC chip (e.g., as firmware) that are executable by a processor (e.g., a microcontroller, such as a video encoder) and/or as logic (e.g., an FPGA).

FIG. 6 illustrates an example of a method 400 for encoding a frame of a video (e.g., a video stream or a video file). The method 400 can be implemented by a multi-processor and/or a multi-core processing system, such as the video processor 50 (e.g., a video encoder) illustrated in FIG. 1.

At 410, a controller (e.g., the controller 66 of FIG. 1) can assign rows of CTUs of the frame to different video processing engines of the video processor. In the example method 400, two such video processing engines, namely a first video processing engine and a second video processing engine, such as the first video processing engine 54 and the second video processing engine 56 illustrated in FIG. 1 are employed. Thus, in the present example, it is presumed that the controller assigns the first row of CTUs of the frame to the first video processing engine and the controller assigns the second row of CTUs to the frame to the second video processing engine.

At 420, the first video processing engine can estimate a QP for the first row of CTUs in the frame. The estimated QP could be, for example a default QP. At 425, the first video processing engine can set the running QP for the first row of CTUs to the estimated QP for the first row of CTUs. The estimated QP can be output to the second video processing engine. At 430, the first video processing engine can encode each CTU in the first row of CTUs in the frame. The CTUs of the first row can be encoded in a manner that ensures that the estimated QP for the first row of CTUs is encoded into a CTU of the first row, as described herein. At 440, a determination can be made by the first video processing engine as to whether a running QP (that may or may not have been updated during the encoding at 430) is different from the estimated QP for the first row of CTUs. If the determination at 440 is negative (e.g., NO), the method 400 can return to 410. If the determination at 440 is positive (e.g., YES), the method 400 can proceed to 450. At 450, in some examples, the estimated QP can be encoded into the last CTU of the first row as the running QP. As an alternative, in some examples, the estimated QP can be encoded into the first CTU of the first row of CTUs. In such a situation, the first CTU 102 of each row is set (e.g., forced) set to a non-skip block if the estimated QP for the current row is different from estimated QP for the previous row. The method can return to 410.

At 455, the second video processing engine can estimate a QP for the second row of CTUs in the frame. The estimated QP could be, for example a default QP. At 460, the second video processing engine can set a running QP for the second row of CTUs to the estimated QP for the first row of CTUs. At 465, the second video processing engine can encode each CTU in the second row of CTUs in the frame. As noted, the encoding at 465 can be implemented in a manner that ensures that the estimated QP for the second row of CTUs is encoded into a CTU of the second row, as described herein. At 470, a determination can be made by the second video processing engine as to whether a running QP (that may or may not have been updated during the encoding at 465) is different from the estimated QP for the second row of CTUs. If the determination at 470 is negative (e.g., NO), the method 400 can return to 410. If the determination at 470 is positive (e.g., YES), the method 400 can proceed to 480. At 480, in some examples, the estimated QP can be encoded into the last CTU of the second row as the running QP. As an alternative, in some examples, the estimated QP can be encoded into the first CTU of the second row of CTUs. In this example, first CTU of each row is set (e.g., forced) to non-skip if the estimated QP for the current row is different from estimated QP for the previous row.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a first processing core configured to:
      determine a first preliminary Quantization Parameter (QP) for a first row of Coding Tree Units (CTUs) in a frame of a video; and
      encode the first row of CTUs in the frame of the video to produce first encoded CTUs, wherein a CTU in the first row of CTUs is encoded with a QP equal to the first preliminary QP; and
   a second processing core coupled to the first processing core,
   the second processing core configured to:
      determine a second preliminary QP for a second row of CTUs of the frame of the video, prior to encoding any CTUs in the second row of CTUs;
      set a running QP to the first preliminary QP for the first row of CTUs, prior to the first processing core encoding a last CTU in the first row of CTUs; and
      encode the second row of CTUs using the running QP, to produce second encoded CTUs.

2. The system of claim 1, wherein the first processing core is further configured to store the first encoded CTUs in memory, and the second processing core is further configured to store the second encoded CTUs in memory.

3. The system of claim 1, wherein each of the CTUs in the first row of CTUs define skip blocks.

4. The system of claim 1, wherein the first QP is encoded as a running QP into the last CTU of the first row of CTUs.

5. The system of claim 1, wherein a last non-skip block CTU of the first row of CTUs is encoded with a QP equal to the first preliminary QP for the first row of CTUs.

6. The system of claim 1, wherein the first processing core is further configured to designate the last CTU of the first row of CTUs as a non-skip block and encode the last CTU of the first row of CTUs with a QP equal to the first preliminary QP for the first row of CTUs.

7. The system of claim 1, wherein the first processing core and the second processing core operate in parallel.

8. The system of claim 1, wherein the first processing core and the second processing core are implemented on an integrated circuit (IC) chip.

9. The system of claim 1, wherein the first processing core is implemented in a first IC chip and the second processing core is implemented in a second IC chip.

10. The system of claim 1, wherein the first row of CTUs is a first group of rows of CTUs of the frame and the second row of CTUs is a second group of rows of CTUs of the frame.

11. A method comprising:
    determining, by a first processing core, a first preliminary quantization parameter (QP) for a first row of coding tree units (CTUs) in a frame of a video;
    encoding, by the first processing core, the first row of CTUs in the frame of the video to produce first encoded CTUs, wherein a CTU in the first row of CTUs is encoded with a QP equal to the first preliminary QP;
    determining, by a second processing core, a second preliminary QP for a second row of CTUs of the frame of the video, prior to encoding any CTUs in the second row of CTUs;
    setting, by the second processing core, a running QP to the first preliminary QP for the first row of CTUs, prior to the first processing core encoding a last CTU in the first row of CTUs; and
    encoding, by the second processing core, the second row of CTUs using the running QP, to produce second encoded CTUs.

12. The method of claim 11, further comprising:
    storing, by the first processing core in a non-transitory computer readable storage medium, the first encoded CTUs; and
    storing, by the second processing core in the non-transitory computer readable storage medium, the second encoded CTUs.

13. The method of claim 11, wherein each of the CTUs in the first row of CTUs define skip blocks.

14. The method of claim 11, wherein the first preliminary QP is encoded as a running QP into the last CTU of the first row of CTUs.

15. The method of claim 11, wherein a last non-skip block CTU of the first row of CTUs is encoded with a QP equal to the first preliminary QP for the first row of CTUs.

16. The method of claim 11, further comprising designating, by the first processing core, the last CTU of the first row of CTUs as a non-skip block and encode the last CTU of the first row of CTUs with a QP equal to the first preliminary QP for the first row of CTUs.

17. The method of claim 11, wherein the first row of CTUs is a first group of rows of CTUs of the frame and the second row of CTUs is a second group of rows of CTUs of the frame.

18. A non-transitory computer readable storage medium storing a first program for execution by a first processing core and storing a second program for execution by a second processing core, the first program including first instructions to cause the first processing core to:
  determine a first preliminary Quantization Parameter (QP) for a first row of Coding Tree Units (CTUs) of a video frame; and
  encode the first row of CTUs in the video frame to produce first encoded CTUs, wherein a CTU in the first row of CTUs is encoded with a QP equal to the first preliminary QP;
  wherein the second program includes second instructions to cause the second processing core to:
    determine a second preliminary QP for a second row of CTUs of the video frame, prior to encoding any CTUs in the second row of CTUs;
    set a running QP for the second row of CTUs to the first preliminary QP for the first row of CTUs; and
    encode the second row of CTUs using the running QP, to produce second encoded CTUs, the running QP being inherited by skip-blocks in the second row of CTUs.

19. The non-transitory computer readable storage medium of claim 18, wherein the first instructions further comprise instructions to cause the first processing core to store the first encoded CTUs in the non-transitory computer readable storage medium, and the second instructions further comprise instructions to cause the second processing core to store the second encoded CTUs in the non-transitory computer readable storage medium.

20. The non-transitory computer readable storage medium of claim 18, wherein each CTU in the first row of CTUs defines a skip-block.

\* \* \* \* \*